United States Patent Office 3,326,432
Patented June 20, 1967

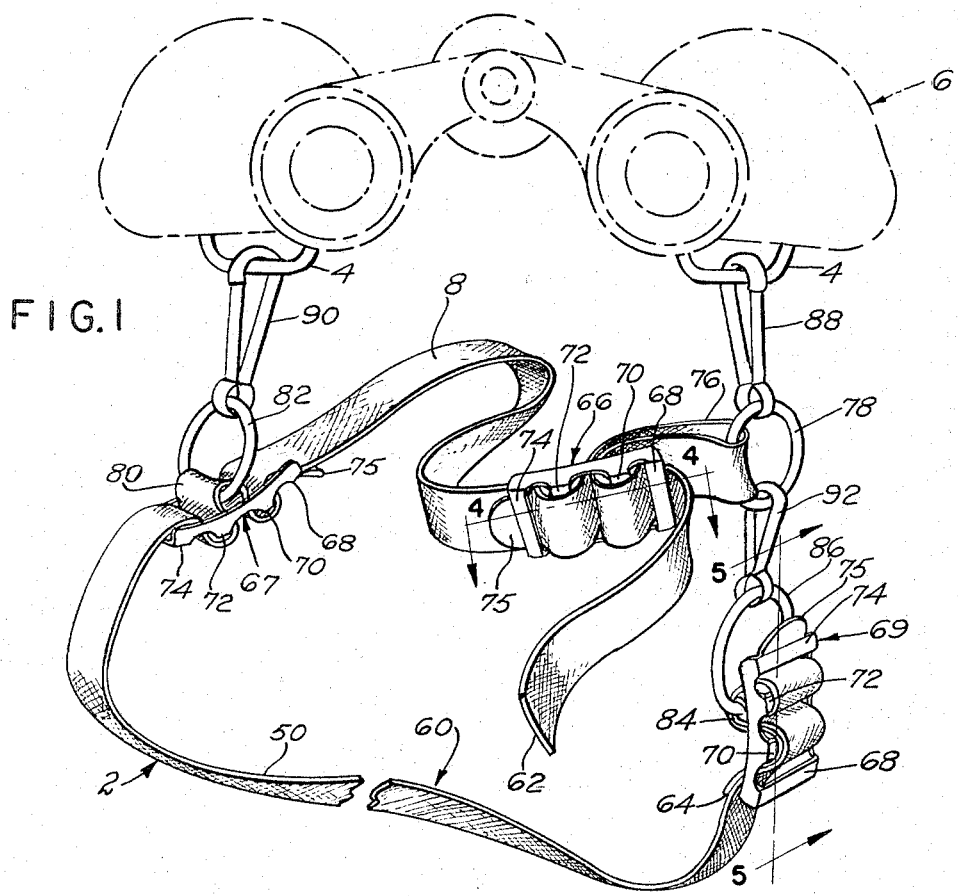
FIG. 1
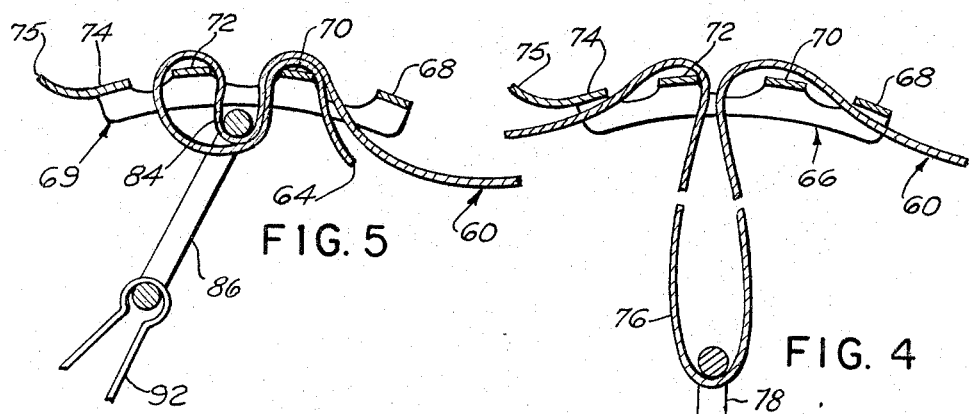
FIG. 5
FIG. 4
INVENTORS,
WILLIAM J. BANKS,
ROBERT W. WATERHOUSE
BY Dike, Thompson, Bronstein, & Mrose
ATTORNEYS

3,326,432
HARNESS
William J. Banks, Plainfield, N.H. (24 Shaw St., Lebanon, N.H. 03766), and Robert W. Waterhouse, Cornish, N.H. (Rte. 2, Windsor, Vt. 05089)
Filed Jan. 12, 1966, Ser. No. 529,903
3 Claims. (Cl. 224—5)

ABSTRACT OF THE DISCLOSURE

A harness of elastic material for holding binoculars or a camera firmly but yieldably against the upper chest out of the way of the wearer so the binoculars or camera do not swing or otherwise hamper the wearer. This permits the wearer to participate in whatever activities he wishes without interference from the binoculars or camera and permits the wearer to easily move the binoculars or camera to his eyes or other face area with only one hand when he wishes to use them without detaching the binoculars or camera from the harness and without any other manipulations except to simply grip the binoculars or camera with one hand and move them to the position desired. After use, it is necessary only to move the binoculars or camera back to the chest without any other movement or manipulation and they remain there out of the way snugly against the chest or to release the binoculars or camera with nothing more and they return to their position against the chest.

---

The present invention relates to an improved and novel harness for carrying binoculars, a camera or the like.

It is a principal object of the invention to provide a harness for binoculars, a camera or the like whereby the binoculars or camera can be comfortably worn without hampering the activity of the wearer and can be used with a minimum of effort and without danger of accidentally dropping them and thereby damaging them or of misplacing or losing them.

Another object of the invention is to provide a simple and novel form of harness for binoculars, a camera or the like made from a single strip of elastic material and having adjustable back strap and neck strap portions accommodating the carrying of the binoculars or camera along the chest of the wearer to be readily brought to face or eye level and obviating the danger of accidentally dropping or losing the binoculars or camera.

These objects are achieved in accordance with the present invention by providing a harness made from the single strip of elastic material and preferably a strip of elastic fabric and trained to provide an adjustable back strap portion, and an adjustable neck strap portion and having means at the juncture of the back strap portion and neck strap portion of the harness for detachably attaching the same to the binoculars or camera. The back strap portion of the harness is adapted to extend snugly under the armpits and around the back of the wearer to hold the binoculars or camera snugly but yieldably against the chest. The neck loop portion of the harness is adapted to extend snugly around the back of the neck of the wearer to hold the binoculars or camera snugly but yieldably against the upper part of the chest out of the way of the wearer when not in use. The elasticity of the back strap and neck loop portions are sufficient to permit the binoculars or camera to be easily moved from the upper part of the chest to the eyes or other part of the face with only one hand merely by stretching the back strap and neck loop portions. Upon completion of use and release thereof, the elastic back strap portion and neck loop portion will return the binoculars or camera to their position snugly against the upper chest.

Other objects and advantages of the invention will be apparent from the following description and accompanying drawings describing and showing for illustrative purposes only preferred embodiments of the invention.

In the drawings:

FIG. 1 is a view in perspective of a harness embodying the present invention detachably attached to a pair of binoculars;

FIGURE 4 is a sectional view taken substantially along line 4—4 of FIGURE 1; and FIGURE 5 is a sectional view taken substantially along line 5—5 of FIGURE 1.

Figure 2:
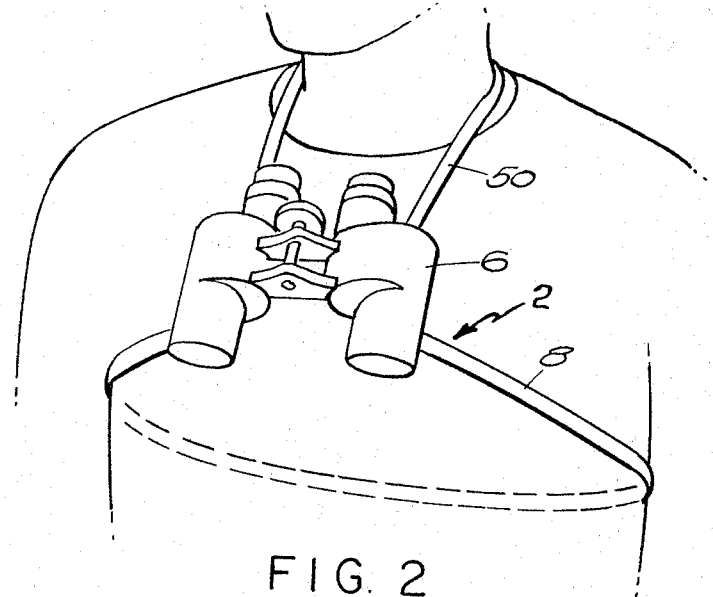
FIG. 2 is a view in perspective of the harness and binoculars of FIG. 1 as worn by the wearer.

Referring to FIGURE 1, 2 represents a harness embodying the invention and attached to the lugs 4 of binoculars 6.

The harness 2 is shown in FIGURE 1 of the drawings as having a neck loop 50 and back strap 8 made from a single length 60 of elastic material, one end of which is designated as 62 and the other end of which is designated as 64. The length 60 is provided with a plurality of buckles 66, 67, and 69. The buckles 66 and 69 form end buckles, and the buckle 67 forms an intermediate buckle and each has four cross bars 68, 70, 72 and 74 and a finger tab 75.

In forming the neck loop 50 and back strap 8 from the single length 60 of elastic material, the end 64 of the length 60 of elastic material may be trained under bar 68 of an end buckle 66, over bar 70 and downwardly through the buckle (FIGURE 4). The length of material may then be trained through a ring 78 and backwardly through the buckle over the bar 72 and under the bar 74. This forms a loop 76 for the ring 78. The buckle 68 may then be moved along the strip of elastic material 60 toward the end 62 of said strip of elastic material, which end may be turned backwardly through the buckle and suitably locked thereto. The end 64 may then be trained to an intermediate buckle 67 where it passes under and over the bars of buckle 67 in the same manner that it did with respect to buckle 66 to thereby form an adjustable loop 80 containing a ring 82.

The length 60 extends from buckle 67 to buckle 69 where it passes under and over the bars of buckle 69 in the same way it did with respect to buckles 66 and 67 to form an adjustable loop 84 containing a third ring 86. However, in the case of this buckle, the length of material after passing over bar 72 is turned back under bar 72 along and under loop 84 and then over bar 70 to the end 64 (FIGURE 5).

Each of the rings 78, 82 and 86 is provided with a removable snap clip 88, 90 and 92. Snap clip 88 is removably clipped to one lug 4 of the binoculars and snap clip 90 is removably clipped to the other lug 4. The remaining clip 92 associated with ring 86 is removably clipped to ring 78 to thereby provide the neck loop 50 and the back strap 8, the effective ends of each of which are removably fastened to the lugs 4. Actually, the rings form the effective ends of both the neck loop 50 and back strap 8 even though the harness is made of only one length of elastic. More particularly, the ring 82, secured to the length of elastic intermediate the ends thereof and of the rings 78 and 86, forms an effective end of each of the neck loop and back strap and ring 78 forms the other effective end of each of them. The two rings 78 and 86 are in effect located at the ends of the length of elastic. Reference to ends of the neck loop and back strap, as used herein, means the effective ends thereof, whether they are made of one length of elastic or more than one length.

The rings 78, 82 and 86 are firmly secured to the length of elastic in adjusted positions but are readily adjustable along the length of elastic to adjust the effective lengths of the neck loop and back strap.

With the embodiment shown, the adjustably fixed items of hardware can be anchored on the length 60 of elastic fabric without recourse to stitching or in any way fixing the fabric to itself to hold the hardware captive. The rings, on being loaded, restrain the buckles from sliding on the fabric by sharply reducing the angle between the fabric segment under the buckle and that over the buckle. However, when the rings are loaded the buckles can be readily slid along the length of fabric for adjustment.

Figure 3:
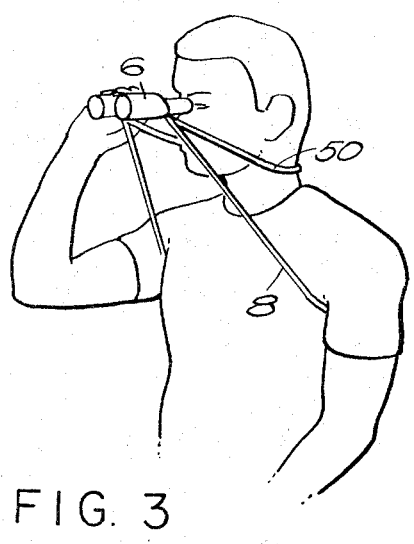
FIG. 3 is a view of the harness and binoculars of FIG. 1 with the binoculars in use and held by one hand to the eyes.

When worn, the back strap 8 extends under the arm pits and around the back of the wearer, as shown in FIGURES 2 and 3, the length of the strap being such that it holds the binoculars snugly but yieldably against the chest of the wearer. The neck loop 50 extends around the back of the neck of the wearer and the length thereof is such as to hold the binoculars snugly but yieldably against the upper chest well out of the way of the wearer. The height of the binoculars on the chest can be adjusted by adjusting the effective length of the neck loop.

It is apparent that with the harness construction of the invention, the dangers of dropping the binoculars or of misplacing them or of losing them are avoided. If the binoculars fall from the hand of the user they merely return to their position against the chest with no harm done. With conventional harnesses, either the binoculars hamper the activities of the wearer or it is necessary to remove the binoculars from the harness or the harness from the body in order to use them. The disadvantages of the former are obvious. The chief disadvantage of the latter is that it requires both hands and considerable effort. Also, the danger of dropping or misplacing the binoculars is increaesd.

It is also apparent that the harness of the present invention is particularly useful for military purposes, for hiking, for mountain climbing, etc., where it is essential that the binoculars shall not hamper the activities of the wearer but can be used swiftly with a minimum of effort and manipulation.

Important advantages of the harness of the present invention are its extreme simplicity and its low cost as well as the simplicity with which it can be applied and removed from the body of the wearer and the comfort with which it can be worn. It does not embody coil springs or housings therefor which increase the cost and complexity of the harness substantially. Furthermore, coil springs have the disadvantage of being uncomfortable and of catching in the clothing of the wearer or pinching the skin when exposed. Housings are required to house the springs at least when they are retracted which housings further complicate and add bulk to the harness. Also, coil springs are more subject to mechanical failure and fatigue than elastic bands.

Another advantage of the harness of the present invention is that it can be easily applied and removed from under heavy outer garments without removal of the outer garments. This is particularly advantageous for outdoor use in cold climates.

Still another advantage is that tension in the harness holds the binoculars, camera or the like from four directions. The resultant holding force holds the binoculars, camera or the like in an adjustable and comfortable position on the chest, i.e., not too close to the neck and not to far down on the chest.

We claim as our invention:

1. In a harness for carrying binoculars, a camera and the like snugly against the chest of the wearer,
    a single length of elastic material formed to provide an adjustable elastic back strap having means at its ends for detachably attaching binoculars, a camera and the like to said back strap and adapted to extend snugly under the arm pits and around the back of the wearer,
    said single length of elastic material also being formed to form an elastic neck loop forming a continuation of said back strap and adapted to extend snugly around the back of the neck of the wearer to hold said binoculars, camera and the like snugly against the upper part of the chest out of the way of the wearer when not in use,
    the elasticity of said single length of elastic material being sufficient to accommodate use of said binoculars, camera and the like by stretching said back strap and said neck loop to move the binoculars, camera and the like to the face,
    said single length of elastic material having a plurality of ring means and a plurality of buckles adjustable in position along said length of elastic material,
    each of said buckles having means providing a loop in said length of elastic material, for securing a ring means thereto for adjustment of said ring means along said length of elastic material.

2. The harness of claim 1,
    wherein one of said ring means is located at one end of said length of elastic material, another of said ring means is located at the other end of said length of elastic material, and a third of said ring means is located intermediate the ends of said length of elastic material to provide an effective end of said neck loop and said back strap.

3. A harness in accordance with claim 2,
    wherein each buckle has at least four spaced bars, for training the strip of elastic material over and under said bars to form an adjustable loop in the space between two of said bars,
    wherein a ring is located in each loop,
    wherein the rings on the end loops are clipped together, and wherein the one ring and one intermediate ring defining the ends of the back strap have snap clips thereon for attachment to binoculars, a camera and the like.

References Cited
UNITED STATES PATENTS

| | | | |
|---|---|---|---|
| 171,961 | 1/1876 | Smith | 24—258 |
| 1,846,846 | 2/1932 | Coffman | 224—5 |
| 1,865,353 | 6/1932 | Brewster | 224—5 |
| 2,441,115 | 5/1948 | Lambert | 224—5 |
| 2,643,803 | 6/1953 | Bates | 224—5 |
| 2,711,122 | 6/1955 | Klumpp | 224—5 |
| 3,152,738 | 10/1964 | Worsfold | 224—5 |

FOREIGN PATENTS

| | | |
|---|---|---|
| 245,405 | 3/1912 | Germany. |
| 650,268 | 2/1949 | Great Britain. |

GERALD M. FORLENZA, *Primary Examiner.*

J. E. OLDS, *Assistant Examiner.*